United States Patent [19]

Ariyoshi, deceased

[11] Patent Number: 5,154,554
[45] Date of Patent: Oct. 13, 1992

[54] BALANCER ATTACHMENT OF THE MAIN SPINDLE OF A MACHINING APPARATUS

[75] Inventor: Yukihiko Ariyoshi, deceased, late of Yamaguchi, Japan, by Kiyoko Ariyoshi, executrix

[73] Assignees: Kabushikaisha Otec; Kabushikikaisha Ariyoshi Kikoshudan, both of Japan

[21] Appl. No.: 796,011

[22] Filed: Nov. 22, 1991

[30] Foreign Application Priority Data

Nov. 30, 1990 [JP] Japan .................. 2-336827

[51] Int. Cl.$^5$ ............................. B23B 47/00
[52] U.S. Cl. .................. 409/141; 74/573 R; 408/143
[58] Field of Search ............. 408/143, 147; 409/141; 74/573 R, 574

[56] References Cited

U.S. PATENT DOCUMENTS 4,626,144  12/1986  Berner .................. 409/141
5,074,723  12/1991  Massa et al. ........... 409/141

FOREIGN PATENT DOCUMENTS 498431  4/1976  U.S.S.R. .................. 74/573

Primary Examiner—Daniel W. Howell
Attorney, Agent, or Firm—Jones, Tullar & Cooper

[57] ABSTRACT

Disclosed is a balancer attachment for the spindle of a machining apparatus using two primary and secondary balancers operatively coupled so as to allow the primary balancers to take major part in balancing while an associated tool traverses a short distance, and allow the secondary balancers to take major part in balancing while the tool traverses a long distance. These balancers follow circular arcs to bring their weights in the direction which is opposite to the linear displacement of a tool-carrying slide, thereby maintaining equilibrium in the rotating mass.

2 Claims, 7 Drawing Sheets

BALANCER ATTACHMENT OF THE MAIN SPINDLE OF A MACHINING APPARATUS

BACKGROUND OF THE INVENTION

1. Field of the Invention

The present invention relates to a balancer attachment for the spindle of a machining apparatus which is capable of compensating any imbalance caused by deviation of the center of gravity of the spindle when displacing and putting an associated cutting tool in a desired radial position.

2. Description of Prior Arts

In machining and shaping a piece of metal into a circular cross section the piece of metal is attached to the spindle end, and it is revolved at an increased speed to enable a stationary cutting tool to shape the workpiece into the cylindrical body. Assume that a part of workpiece which is not in cylindrical form is shaped into a circular cross section. Uneven distribution of the weight of the workpiece in the workspindle end will cause an appreciable imbalance and instability when the workpiece is revolved at an increased speed, thereby reducing the working precision and the durability of the workspindle. Particularly in case that a workpiece is large and heavy, there is a fear of allowing the workpiece to get off from the workspindle when revolving at an increased speed.

In an attempt to solve these problems it is proposed that a workpiece is fixed to the work bench of a machining apparatus and that a cutting tool, in turn, is fixed to the workspindle of the machining apparatus. FIG. 9 shows a representative example of machining apparatus of the type just described. Specifically workspindle 1 has a conical hollow 71 whereas cutting tool assembly E has conical projection 72. Conical projection 72 has a grooved end 73. It is inserted in conical hollow 71 of workspindle 1, and its grooved end 73 is caught by a collet (not shown). This arrangement has the advantageous effect of facilitating attachment of cutting tool assembly E to workspindle 1. The radial position of cutting tool assembly E must be controlled while machining. Necessary adjustment, however, must be made by stopping revolution of cutting tool assembly E and driving adjusting screw 75 to bring cutting tool 74 to a desired radial position. The fine adjustment, however, is very tedious, and requires skilfulness.

In the hope of eliminating such difficulties a tool attachment as shown in FIG. 10 is proposed. It comprises tool slide 7 on the end of hollow cylindrical spindle 1 of a machining apparatus, and a drive shaft (not shown) extending in spindle 1 and operatively connected to tool slide 7. Rotation of the drive shaft will cause cutting tool such as a single-point tool C to move across the end of workspindle 1 to a desired radial position. Advantageously the arrangement of FIG. 10 permits adjustment of tool radial position without stopping revolution of workspindle 1, accordingly improving the working efficiency. Deviation of the center of gravity of the rotating mass apart from the rotary axis of spindle 1 increases with displacement of slide 7 and tool C. Specifically when spindle 1 is revolved at the rate of 1000 revolutions per minute, a relatively large centrifugal force is generated in a direction from the central axis of spindle 1 to the center of gravity of slide 7, thereby reducing rotating and machining precision, and also reducing the durability of spindle 1. Therefore, the machining apparatus equipped with such tool attachment can be used only at a decreased speed.

In an attempt to reduce such imbalance caused by deviation of the center of gravity of the rotating mass rotary disk 2 is fixed to the end of spindle, and, as shown in FIG. 11, slide 7 is sandwiched between two rectangle weights 46 via rack and pinion 47. Each weight 46 is one half of slide 7 in weight. With this arrangement the shift of slide 7 in one direction will cause the shift of two weights 46 in the opposite direction. As a matter of fact, when slide 7 is displaced a given distance in one direction, two weights are shifted same distance in the opposite direction, and therefore, the size of whole unit is increased accordingly. Still disadvantageously, when slide 7 is being shifted in one direction, weights 46 are being shifted in the other direction, and as a matter of fact, this is likely to promote unnecessary displacement of slide 7 via racks and pinions 46. Accordingly the precision of displacement of slide 7 and associated tool, and hence machining precision will be lowered.

SUMMARY OF THE INVENTION

In view of the above one object of the present invention is to provide a balancer attachment for the spindle of a machining apparatus which attachment has balancing means of relatively small size, and is capable of preventing undesired displacement of its tool slide due to the centrifugal force generated during rotation.

Another object of the present invention is to provide a balancer attachment for the spindle of a machining apparatus which attachment is capable of reducing an appreciable imbalance which will be caused by an associated tool when displaced to a remote position from the center of revolution, thereby assuring the machining accuracy even in this case.

To attain said one object of the present invention a balancer attachment for the spindle of a machining apparatus comprises: a rotary disk to be fixed to the end of the spindle of the machining apparatus, a traverse slide fixed to said rotary disk to be movable in diametrically opposite directions from the central axis of the spindle, said traverse slide having a longitudinal slot made centrally in its rear surface, and a pair of primary balancers each comprising a sector weight and a shank integrally connected thereto, and each being rotatably fixed to said disk about the intermediate pivot of the shank with the end of each shank slidably fitted in the longitudinal slot in the rear surface of the traverse slide.

To attain said another object of the present invention said sector weight has guide means; said disk has an annular flange integrally connected to its circumference and extending radially inside; and said balancer attachment further comprises two secondary balancers each comprising a weight slidably fixed to the edge of said annular flange and having a guide slot to slidably accept the guide means of said weight of each primary balancer.

As regards the former balancer attachment for the spindle of a machining apparatus; as the traverse slide is moved rightwards, the ends of the shanks of the two primary balancers are moved apart from each other in the longitudinal slot of the rear surface of the disk, and the sector weights are moved towards each other until the equilibrium is maintained in the disk. In getting closer to each other, the primary balancers follow circular arc, and therefore, they will not travel an extended linear distance as is the case with the conventional balancers, which follow linear paths.

Assume that the rotary disk with its primary balancers thus put in eqiuilibrium condition is rotated at an increased speed. The weights of the primary balancers will be liable to return to the center position, and the returning force thus generated will have the effect of preventing undesired shift of the traverse slide via the shank ends of the primary balancers.

As regards the latter balancer attachment; as the traverse slide is moved rightwards, the sector weights of the primary balancers are moved towards each other, thereby causing the two secondary balancers to travel towards each other along the circular edge of the annular frange of the rotary disk.

The centrifugal force of the traverse slide increases linearly with the increase of the distance which it traverses on the rotary disk. As the traversing distance of the slide increases, its centrifugal force will be larger than the resultant force of the centrifugal forces of the primary balancers, thus causing imbalance in the rotating mass so far as only the primary balancers are relied on.

The radius from the center of gravity of the weight of the primary balancer to the pivot of the primary balancer is smaller than the radius from the center of gravity of the weight of the primary balancer to the center of the disk. As the primary balancer rotates, the radius from the center of gravity of the weight of the primary balancer to the center of the disk reduces gradually. Accordingly the centrifugal force of the weight of the primary balancer, which is given by $S = m \ r \ \omega^2$ (m:mass, r:radius, and $\omega$:angular velocity) will decrease gradually.

While the secondary balancer travels along the circular edge of the annular frange of the rotary disk, the radius from the center of gravity of the secondary balancer to the center of the disk (or the center of the spindle) remains constant, and therefore the centrifugal force of the secondary balancer remains constant in magnitude, changing only in direction so as to compensate the imbalnce between the traverse slide and the primary balancer. Thus, this arrangement can reduce completely the imbalance due to displacement of the traverse slide in the rotary disk, thus preventing reduction of the machining precision and the durability of the spindle.

While the rotary disk is rotated, the secondary balancers are pushed against the annular frange of the rotary disk under the influence of centrifugal force, thus preventing the primary balancers from returning towards the neutral position via connecting pins to keep the primary balancers inclined at a correct angle.

BRIEF DESCRIPTION OF THE DRAWINGS

Other objects and advantages of the present invention will be understood from the following description of preferred embodiments of the present invention, which are shown in accompanying drawings.

DETAILED DESCRIPTION OF PREFERRED EMBODIMENTS

Figure 1:
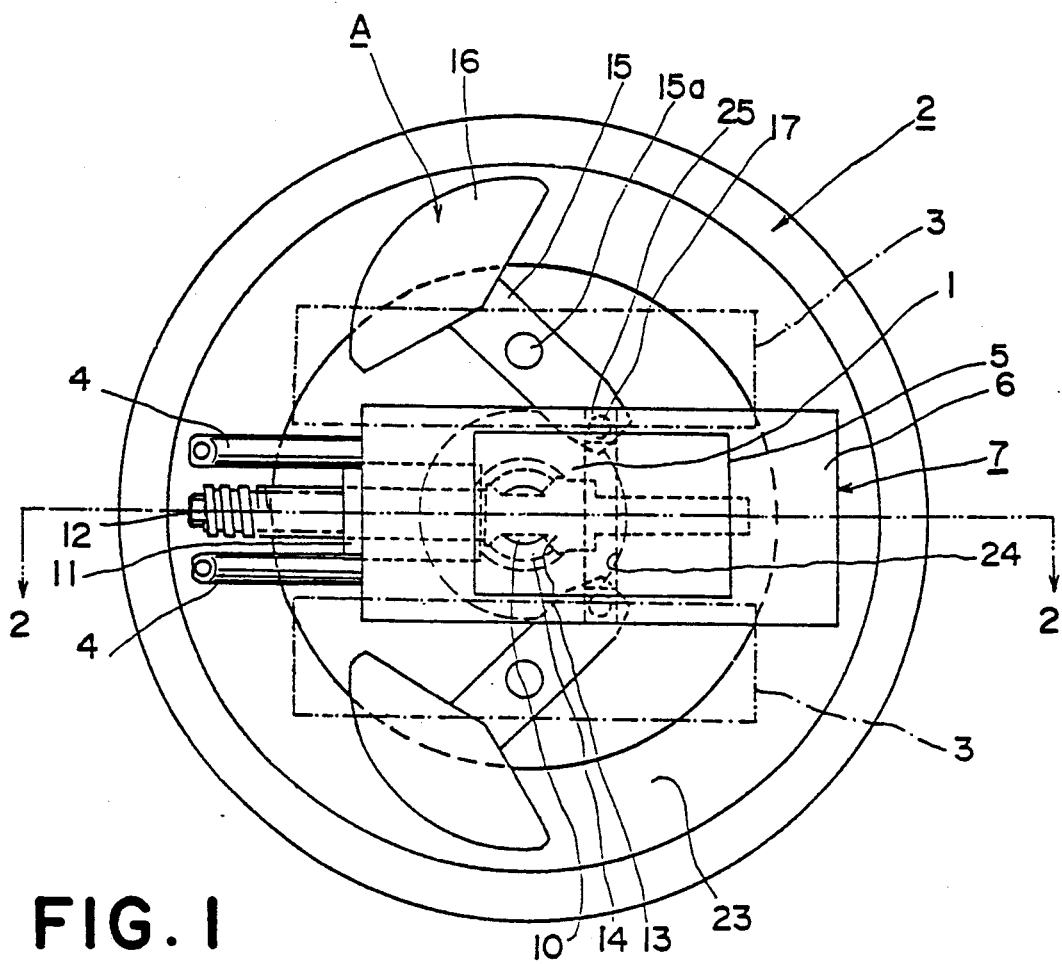
FIG. 1 is a front view of a balancer attachment according to a first embodiment.
Figure 2:
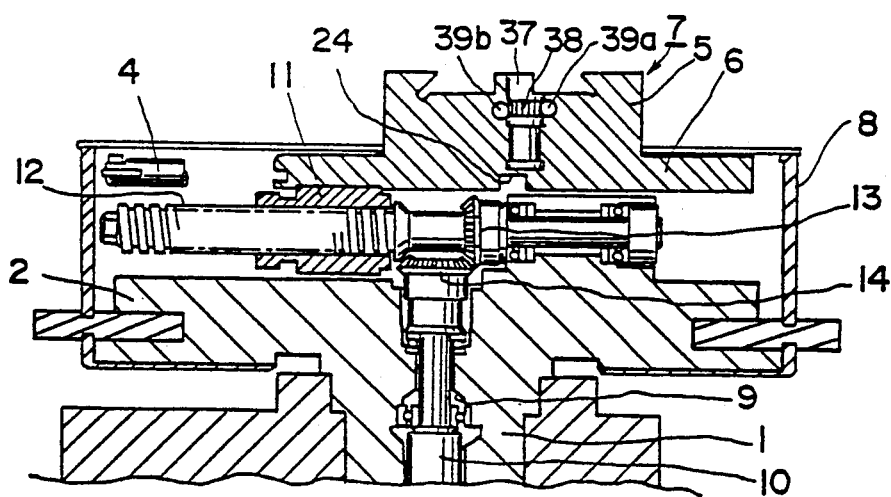
FIG. 2 is a sectional view of the balancer attachment taken along the line 2-2 in FIG. 1.

FIGS. 1 and 2 show a balancer attachment for the spindle of a machining apparatus according to a first embodiment of the present invention. As shown, rotary disk 2 is fixed to the end of hollow cylindrical spindle 1 perpendicular thereto. A pair of parallel holder rods (not shown) are provided on the front of rotary disk 2.

Traverse slide 7 consists of an integration of tool holder cubic 5 and flat base plate 6, and traverse slide 7 is slidably fitted in between the parallel rods. Push plates 3, 3 are applied to the parallel rods to permit slide 7 to traverse freely on rotary disk 2.

Tool drive shaft 10 is in inner space 9 of spindle 1. Drive means for driving spindle 1 and tool drive shaft 10 are equipped with transmission to permit spindle 1 and tool drive shaft 10 to rotate normally at same speed in same direction, and permit tool drive shaft 10 to rotate at speed which is different from the rotating speed of spindle 1 only when traverse slide 7 is desired to traverse.

Female nut 11 is fixed to the rear surface of traverse slide 7 as seen leftwards in FIGS. 1 and 2, and male bolt 12 is inserted in female nut 11. Male bolt 12 has conical gear wheel 13 integrally connected to the intermediate portion thereof. Likewise, tool drive shaft 10 has conical gear wheel 14 integrally connected to the end thereof. Conical gear wheel 13 is mated with conical gear wheel 14. Rotary disk 2 is provided with two parallel rods 4, 4, which passes through traverse slide 7. Each parallel rod has spring means (not shown) to urge traverse slide 7 rightwards in the drawings all the time.

Each of a pair of primary balancers A comprises weight 16 and shank 15 integrally connected thereto. Each primary balancer A is rotatably fixed to disk 2 about the intermediate point of shank 5 by pin 15a. Traverse slide 7 has longitudinal slot 24 made centrally in its rear surface. The end of each shank 15 is slidably fitted in longitudinal slot 24 by inserting square head 25 of associated square-headed pin 17 therein.

As seen from FIG. 2, rotary disk 2 is enclosed in casing 8 to prevent invasion of foreign substances.

Figure 8:
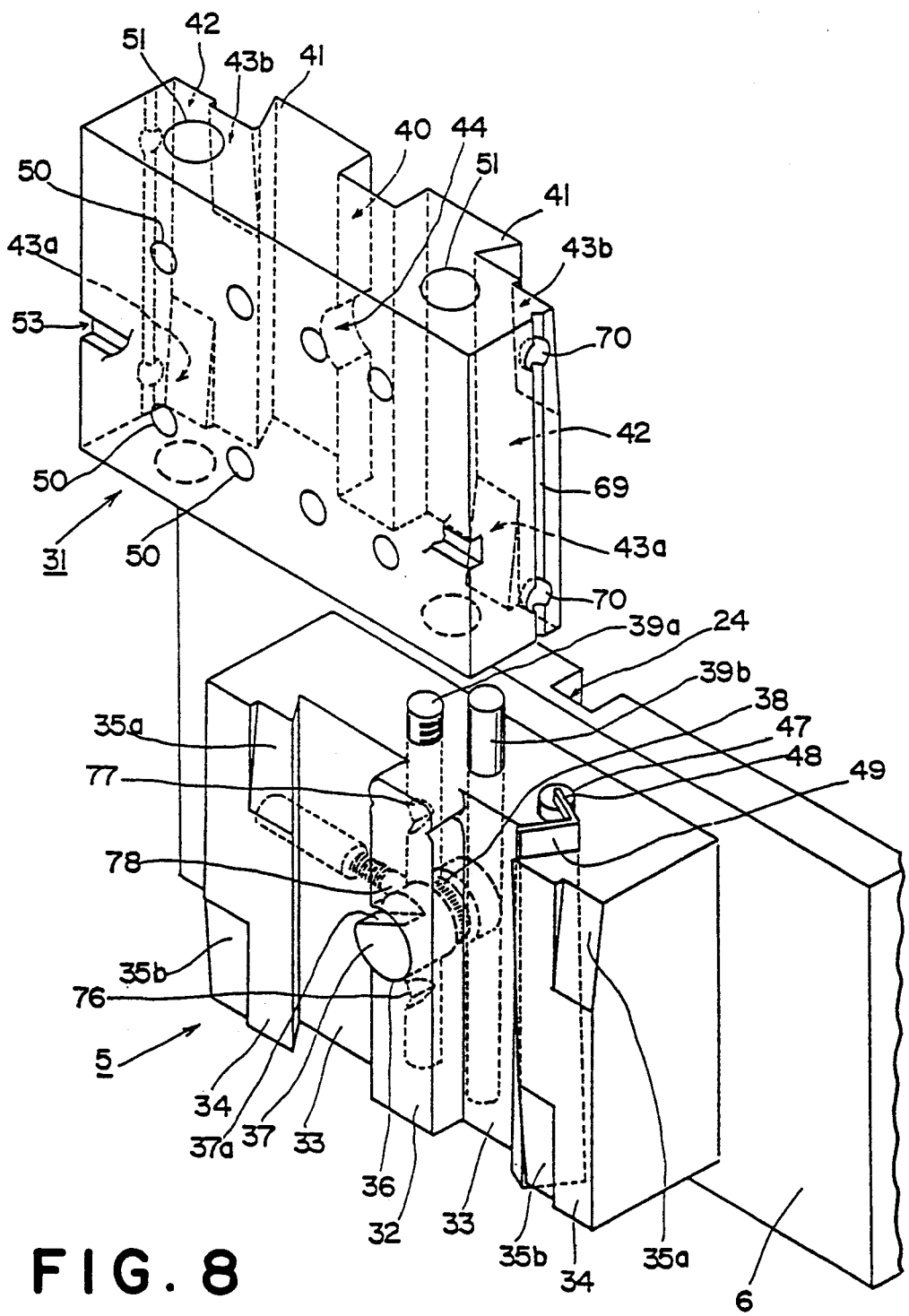
FIG. 8 is a perspective view of a tool attachment and an associated adapter, showing how they are connected together.
Figure 9:
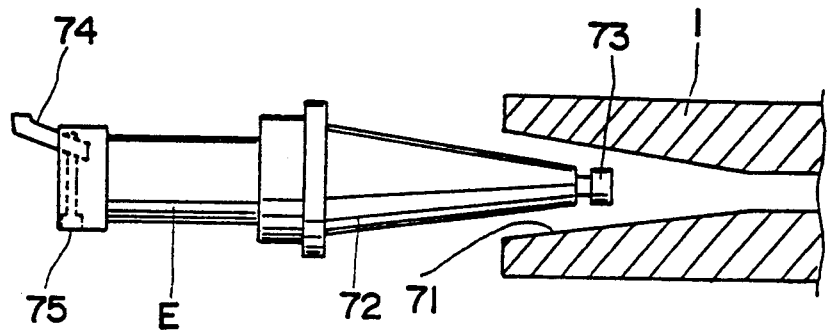
FIG. 9 is a side view of a conventional tool attachment.
Figure 10:
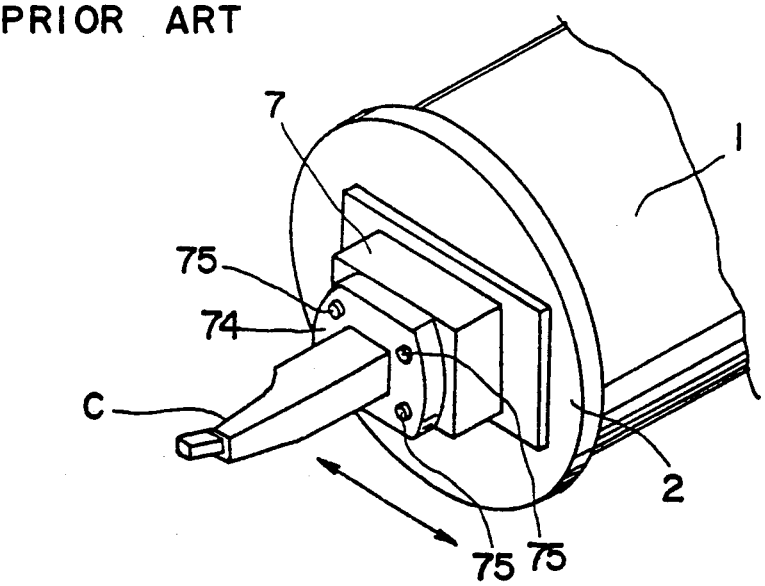
FIG. 10 is a perspective view of another conventional tool attachment.
Figure 11:
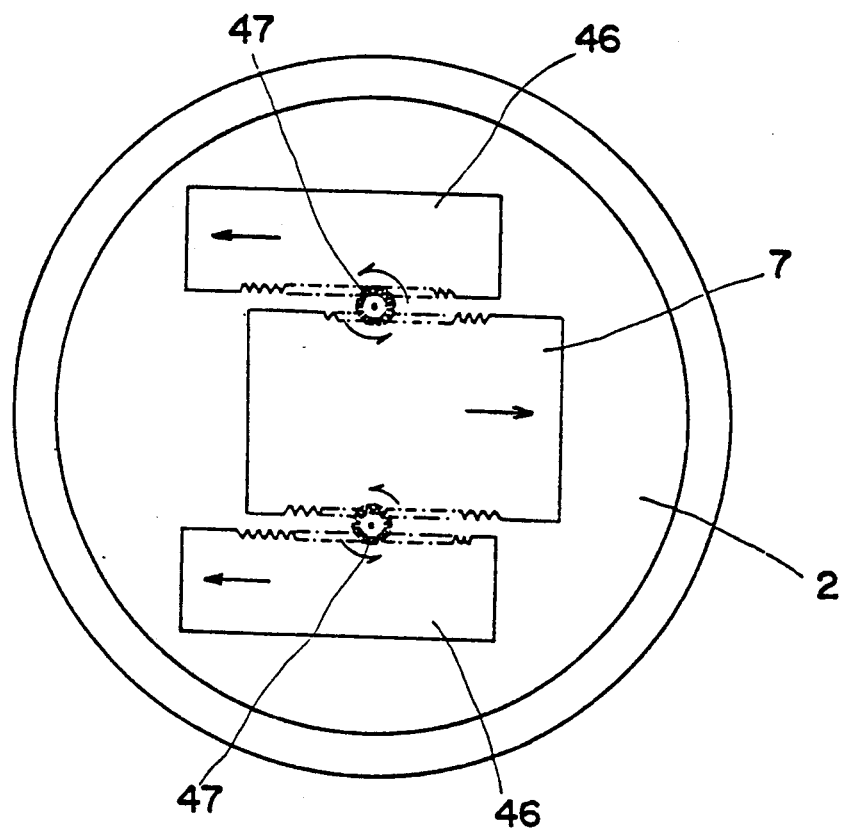
FIG. 11 is a front view of a conventional balancer attachment.

Attachment to hold a cutting tool C to the front of tool holder cubic 5 is described below with reference to FIG. 8.

As seen from the drawing, the front of tool holder cubic 5 has center guide projection 32 and opposite side guide projections 34. Parallel slots 33 are defined between center and side guide projections 32 and 34. The top surface of each side guide projection 34 has two slant sections 35a and 35b at its diagonally opposite corners, thus leaving a staggered-rectangular section on its top surface.

Center guide projection 32 has a notched cylindrical rod 37 rotatably fitted in hole 36. Notched cylindrical rod 37 has vertical flat plane 37a and toothed circumference 38 in the form of pinion. This pinion 38 is mated with parallel racks 39a and 39b, which are slidably fitted in through holes made in tool holder cubic 5. Rack 39a has two notches 76 and 77 made on its rear side, and these notches 76 and 77 are adapted to accept spring-biased catch bolt 78 when rack 39a is raised or lowered to predetermined vertical positions in which notched cylindrical rod 37 is rotated to have its vertical flat plane 37a flush with the side of center guide projection 32 or its round circumference projecting from the side of center guide projection 32.

Steel wedge 49 whose width diverges somewhat downwards is inserted in slot 33 until its "L"-shaped top 48 is caught by push rod 47, which is resiliently urged upwards to appear from the top side of tool holder cubic 5.

As for adapter 31 to be attached to tool holder cubic 5 it has a center slot 40 to accept center guide projection 32 of tool holder cubic 5, "V"-shaped projections 41 are adapted to fit in parallel slots 33 of tool holder cubic 5 and two staggered-rectangular sections 42 are adapted to fit on the staggered-rectangular sections of opposite side guide projectionsw 34 of tool holder cubic 5. Each staggered-rectangular section 42 has slant sections 43a and 43b at its diagonally opposite corners. Semicircular recess 44 is made in left "V"-shaped projection 41 to allow notched cylindrical rod 37 to enter when it turns.

In attaching adapter 31 to tool holder cubic 5 "L"-shaped top 48 of steel angle wedge 49 is pushed down with the aid of an appropriate hydraulic means, and at the same time rack 39a is pushed down to rotate notched cylindrical rod 37 until its vertical flat plane 37a is flush with the side of center guide projection 32. Then, spring-biased catch bolt 78 is allowed to advance and fit in notch 77 on the rear side of rack 39a, thus holding rack 39a in first predetermined position in which notched cylindrical rod 37 is prevented from rotating, and is kept with its vertical flat plane 37a flush with the side of center guide projection 32. The other rack 39b rises as a counter action to the pushing-down of rack 39a.

Now, adapter 31 is allowed to fit and descend on the surface of tool holder cubic 5, and consequently adapter 31 is nested with tool holder cubic 5 with "V"-shaped projections 41 inserted in parallel slots 33.

When adapter 31 starts descending on tool holder cubic 5, each slant section 43a of adapter 31 rides on the staggered-rectangular surface 34 of each side wall of tool holder cubic 5 to assist adapter 31 in aligning with tool holder cubic 5 so that "V"-shaped projections 41 may be fitted exactly in parallel slots 33 of tool holder cubic 5. Then, rack 39b is pushed down to rotate pinion 38 until notched cylindrical rod 37 is fitted in semicircular recess 44 of "V"-shaped projection 41, thereby permitting adapter 31 to be mated with tool holder cubic 5. At the same time, rack 39a is raised until spring-biased catch bolt 78 is allowed to advance and fit in notche 76, thereby keeping rack 39a at second predetermined position, preventing notched cylindrical rod 37 from turning. Finally, wedge 49 is released to allow it to resiliently rise from depression, thus integrally connecting adapter 31 to tool holder cubic 5.

Adapter 31 carries a cutting tool C, and traverse slider 7 carries adapter 31. Thus, machining can be performed by rotating spindle 1, which is connected to traverse slider 7.

Figure 3:
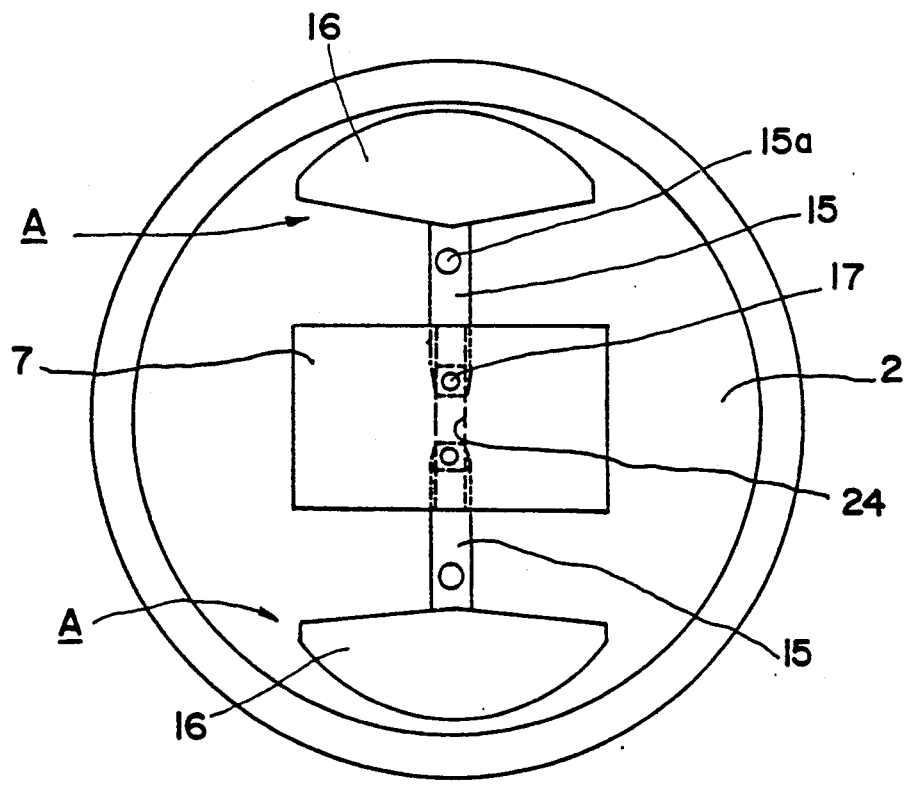
FIGS. 3 and 4 are front views of the balancer attachment showing how its primary balancers work.

FIG. 3 shows the position of rotary disk 2 in which traverse slide 7 is not displaced. The center of gravity of traverse slide 7 and cutting tool C is on the center axis of spindle 1. As upper and lower primary balancers A are put in neutral position, the center of gravity of each member on rotary disk 2 (or the resultant centrifugal force of traverse slide 7 and primary balancers A) is on the center axis of spindle 1. Cutting tool C will rotate about the center axis of spindle 1.

Figure 4:
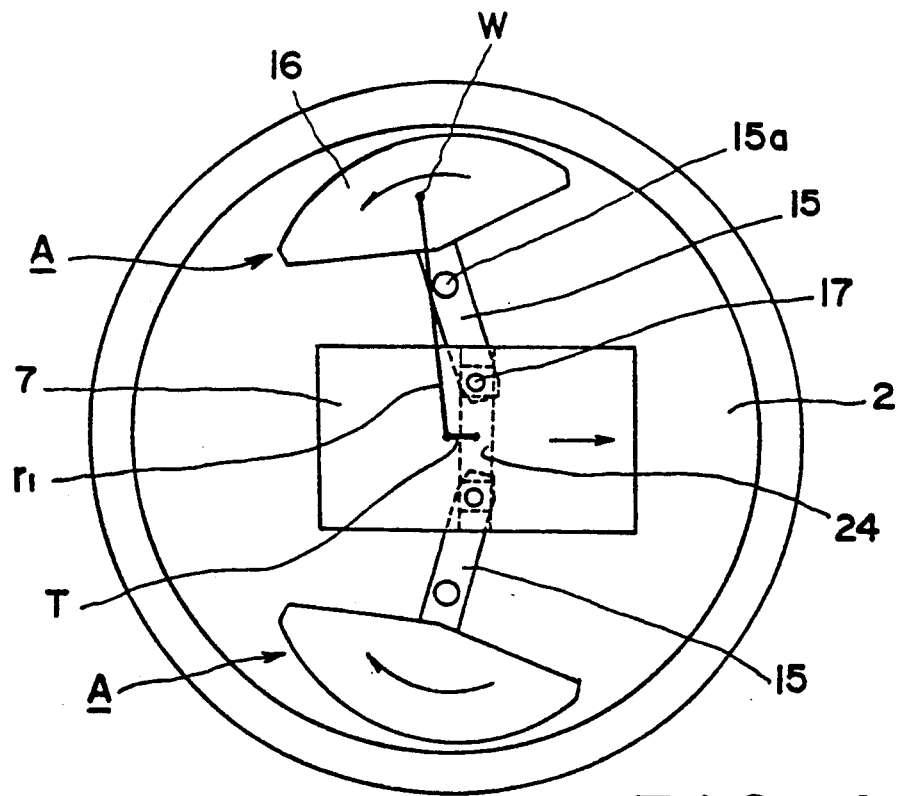

Next, assume that tool drive shaft 10 is rotated at a speed which is different from the rotating speed of spindle 1. Then, rotating conical gear wheel 14 rotates bolt 12, thereby causing nut 11 and hence traverse slide 7 to move across rotary disk 2. FIG. 4 shows the position in which traverse slide 7 is displaced rightwards. As traverse slide 7 is displaced rightwards, the square heads of guide pins 17 of primary balancers A move apart from each other in guide slot 24 of traverse slide 7, thereby causing weights 16 of primary balancers A to move towards each other in such directions that equilibrium may be maintained on rotary disk 2.

Primary balancers A follow circular arcs, and therefore they do not travel a relatively long linear way as is the case with the conventional balancer.

Rotation of spindle 1 at an increased speed will induce weights 16 of primary balancers A to return to neutral position under the influence of centrifugal force, and this force will be applied to traverse slide 7 via the ends of shanks 15 of primary balancers A in a direction to prevent displacement of traverse slide 7. Therefore, there is no fear of allowing traverse slide 7 to travel undesired long distance.

As seen from FIG. 1, traverse slide 7 is urged rightwards by springs (not shown) fitted on guide shafts 4, and therefore no error will be caused in traversing distance by the play between nut 11 and bolt 12.

The balancer attachment described so far may be equipped with secondary balancers according to the present invention, as will be described below.

First, referring to FIG. 4, the radius from the center of gravity "W" of weight 16 to pivot 15a is shorter than the radius r1 from the center of gravity "W" of weight 16 to spindle 1, and the radius r1 will reduce gradually as balancers A rotate towards each other. Accordingly the centrifugal force of weight 16, which is given by $S = m\ r\ \omega^2$ (m:mass, r:rdius of rotation, and $\omega$: angular velocity), will decrease gradually.

On the other hand the centrifugal force of traverse slide 7 will increase with the increase of traverse distance "T". Therefore, as traverse distance "T" increases, the centrifugal force of traverse slide 7 will be larger than the resultant force of the centrifugal forces of upper and lower primary balancers A, thus causing an appreciable imbalance in rotary disk 1.

Figure 5:
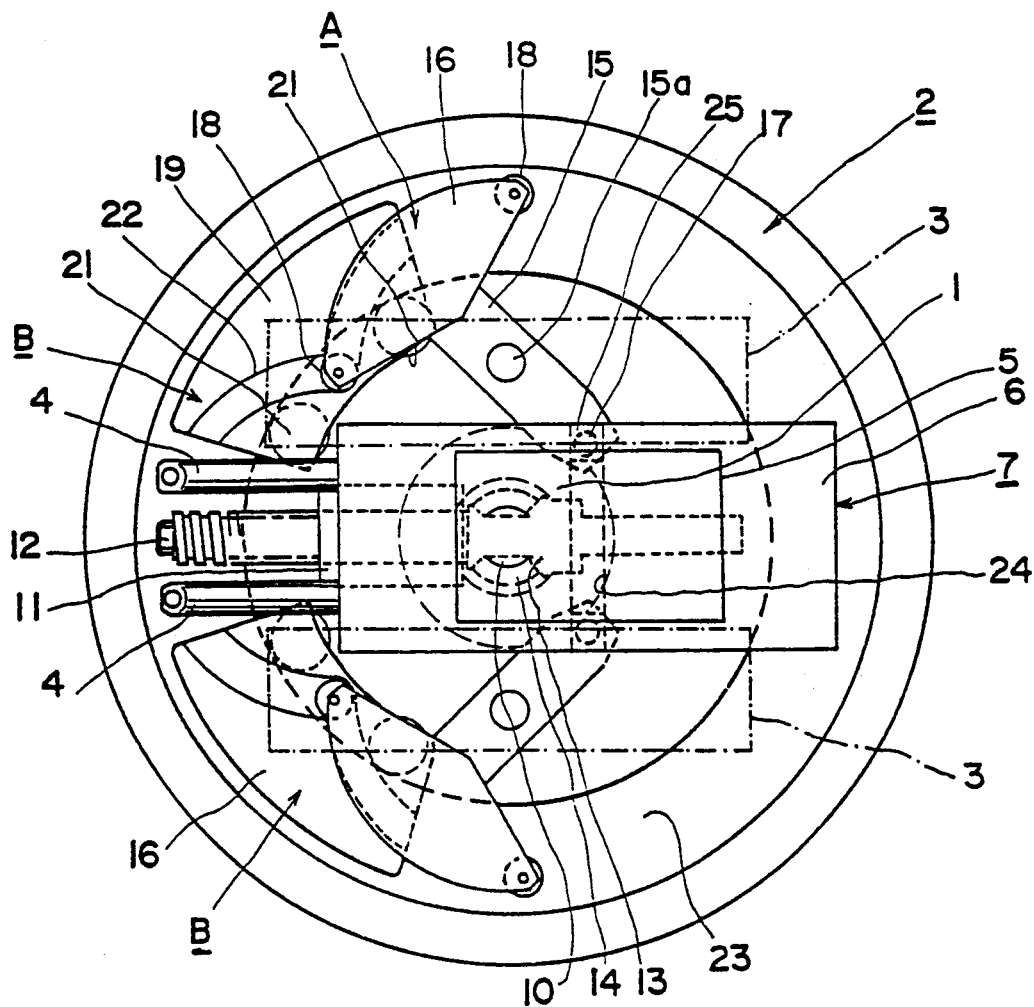
FIG. 5 is a front view of a balancer attachment according to a second embodiment.
Figure 6:
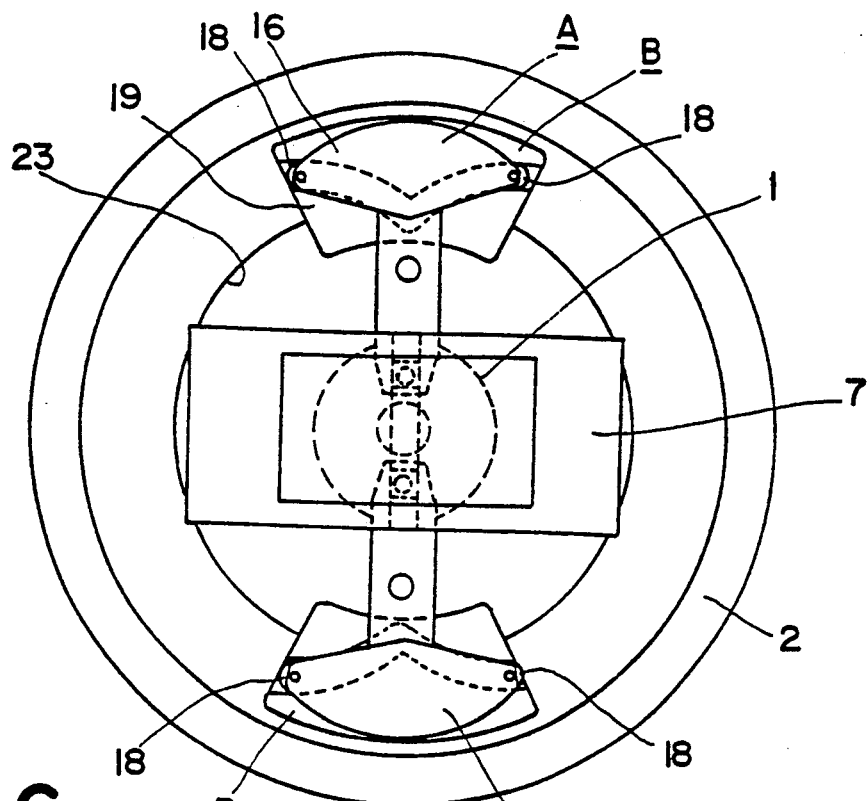
FIGS. 6 and 7 are front views of the balancer attachment showing how its secondary balancers work.
Figure 7:
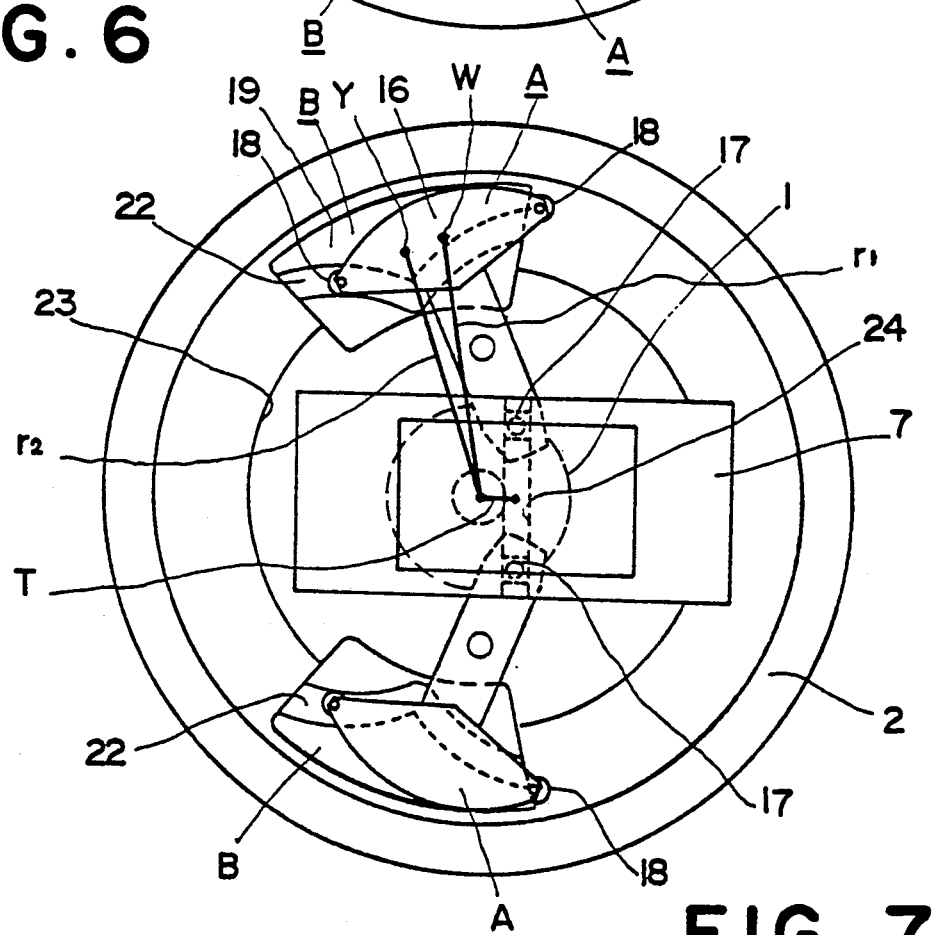

In an attempt to reduce such imbalance the balancer attachment is equipped with secondary balancers according to the present invention, thereby compensating for the insufficient amount of centrifugal force of primary balancers A. FIGS. 5 to 7 show a balancer attachment equipped with secondary balancers according to the second embodiment of the present invention. As seen from these drawings, annular flange 23 is integrally connected to the circumference of rotary disk 2 to extend radially inside. Two sector weights 19 sandwich annular flange 23, and the lower sides of sector weights 19 are connected by the shafts of two rolls 21. Front sector weight 19 has "V"-shaped groove 22, which is composed of two circular arcs combined generally in the form of the letter "V". Thus, one secondary balancer is provided, and it can travel freely along the inner circular edge of flange 23 with the aid of its rolls 21. Similarly, another secondary balancer B is provided.

Weight 16 of each primary balancer A has guide pins 18 on its opposite ends. Each secondary balancer B is connected to associated primary balancer A with one or both of guide pins 18 of weight 16 in "V"-shaped groove 22 of sector weight 19.

Assume that a cutting tool is fixed to a tool holder which is to be balanced with the aid of primary and secondary balancers A and B.

FIG. 6 shows the condition in which traverse slide 7 is not shifted, and in this condition the center of gravity of traverse slide 7 and associated cutting tool C is on the center axis of spindle 1. As seen from FIG. 6, primary and secondary balancers A and B are put in neutral position in rotary disk 2, and the center of gravity of each unit on rotary disk 2 (i.e. resultant centrifugal force of traverse slide 7, primary and secondary balancers A and B) is on the center axis of spindle 1. Therefore, cutting tool C rotates about the central axis of spindle 1.

Next, assume that tool drive shaft 10 is rotated at a speed which is different from the rotating speed of spindle 1. Conical gear wheel 14 is rotated to rotate bolt 12 about its axis, and then nut 11 is driven to move traverse slide 7. Thus, traverse slide 7 is displaced rightwards as shown in FIG. 7. While guide pins 17 of primary balancers A are sliding apart from each other along guide slot 24 on the rear surface of traverse slide 7, these guide pins 17 move rightwards, and accordingly primary balancers A rotate towards each other so that they may have major components of displacement in a direction which is opposite to displacement of traverse slide 7. At the same time, secondary balancers B move closer to each other along the inner circumference edge of flange 23 through the agency of guide pins 18 sliding in "V"-shaped grooves 22 of secondary balancers B.

Now, the balancing relation between primary and secondary balancers A and B and traverse slide 7 is described.

The centrifugal force of traverse slide 7, which is given by $S = m r \omega^2$, will increase with traversing distance T of traverse slide 7. The rotating radius of primary balancer A (distance from pivot 15a to the center of gravity W of primary balancer A) is smaller than the rotating radius r1 of the center of gravity W of weight 16. The rotating radius r1 will decrease gradually with increase of the rotary movement of primary balancer A. Accordingly the centrifugal force of weight 16 caused by rotation of rotary disk 2 (given by $S\ 1 = m1\ r1\ \omega^2$) will decrease gradually. The resultant centrifugal force of upper and lower primary balancers A will not vary in proportion to the traversing distance T of traverse slide 7.

Secondary balancers B will slide along the inner circumference edge of flange 23 of rotary disk 2 to come closer to each other, following the circular arc at a constant distance r2 from spindle 1. Therefore, the resultant centrifugal force of upper and lower secondary balancers B will remain constant, changing only in direction. Thus, while traverse slide 7 is traversing, the resultant centrifugal force of primary and secondary balancers A and B can balance with the centrifugal force of traverse slide 7, provided that al 1 related factors are determined appropriately for the purpose. Specifically while traverse slide 7 is traversing a relatively short distance, primary balancers A will take major part in balancing with traverse slide 7 whereas while traverse slide 7 is traversing a relatively long distance, secondary balancers B will take major part in balancing with traverse slide 7. The resultant centrifugal force of primary and secondary balancers A and B will change in the same way as the centrifugal force of traverse slide 7 in magnitude, but in opposite directions, thus compensating for imbalance which otherwise, would be caused by displacement of traverse slide 7 in rotary disk 2.

Secondary balancers B will be pushed against flange 23 by its centrifugal force, thereby preventing primary balancers A from returning to neutral positions via pins 18 to keep primary balancers A inclined at correct angles.

As may be understood from the above, a balancer attachment according to the present invention uses two primary balancers which are designed to cause rotary movements rather than linear movements in response to the linear displacement of the traverse slide, thus permitting substantial reduction of the size of balancer attachment, still assuring reduction of the imbalance caused by displacement of an associated tool away from the spindle axis of a machining apparatus in rotary disk 2.

Two secondary balancers used in combination with the primary balancers have the effect of reducing an appreciable imbalance which cannot be reduced only by the primary balancers. Thanks to the improvement in balancing condition attained by the balancer attachment, even if rotating-and-cutting operation is performed at an increased rate ranging from 1000 to 1500 revolutions per minute, the accuracy of spindle revolution will not be reduced, and the durability of the machining apparatus will not be adversely affected.

Advantageously the primary and secondary balancers are coupled in simple mechanical connection.

What is claimed is:

1. A balancer attachment for the spindle of a machining apparatus comprising: a rotary disk to be fixed to the end of the spindle of the machining apparatus, a traverse slide fixed to said rotary disk to be movable in diametrically opposite directions from the central axis of the spindle, said traverse slide having a longitudinal slot made centrally in its rear surface, and a pair of primary balancers each comprising a weight and a shank integrally connected thereto, and each being rotatably fixed to said disk about the intermediate pivot of the shank with the end of each shank slidably fitted in the longitudinal slot in the rear surface of the traverse slide.

2. A balancer attachment for the spindle of a machining apparatus according to claim 1 wherein said weight of each primary balancer has guide means; said disk has an annular flange integrally connected to its circumference and extending radially inside; and said balancer attachment further comprises two secondary balancers each comprising a weight slidably fixed to the edge of said annular flange and having a guide slot to slidably accept the guide means of said weight of each primary balancer.

* * * * *